(12) United States Patent
Jang et al.

(10) Patent No.: US 11,248,544 B2
(45) Date of Patent: Feb. 15, 2022

(54) GAS HEAT-PUMP SYSTEM

(71) Applicant: LG ELECTRONICS INC., Seoul (KR)

(72) Inventors: Heejoong Jang, Seoul (KR); Hojong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/111,697

(22) Filed: Dec. 4, 2020

(65) Prior Publication Data
US 2021/0172392 A1 Jun. 10, 2021

(30) Foreign Application Priority Data
Dec. 6, 2019 (KR) .................. 10-2019-0161650

(51) Int. Cl.
*F02D 41/00* (2006.01)
*F02D 41/14* (2006.01)
*F02B 37/12* (2006.01)

(52) U.S. Cl.
CPC ............ *F02D 41/005* (2013.01); *F02B 37/12* (2013.01); *F02D 41/1448* (2013.01); *F02D 41/1453* (2013.01); *F02D 41/1459* (2013.01); *F02D 41/1461* (2013.01); *F02B 2037/122* (2013.01); *F02D 2200/0406* (2013.01)

(58) Field of Classification Search
CPC ............ F02D 41/005; F02D 41/1453; F02D 41/1461; F02D 41/1448; F02D 41/1459; F02D 2200/0406; F02B 37/12; F02B 2037/122
See application file for complete search history.

(56) References Cited

U.S. PATENT DOCUMENTS

| | | | |
|---|---|---|---|
| 2016/0047298 A1* | 2/2016 | Lofgren | F01N 11/002 60/273 |
| 2017/0234252 A1* | 8/2017 | Uesugi | F02D 41/0007 701/105 |
| 2020/0271046 A1* | 8/2020 | Kelly | F01N 3/021 |

FOREIGN PATENT DOCUMENTS

KR 10-2018-0015900 2/2018

* cited by examiner

*Primary Examiner* — Joseph J Dallo
(74) *Attorney, Agent, or Firm* — Ked & Associates LLP

(57) ABSTRACT

Proposed is a gas heat-pump system capable of supplying recirculation exhaust gas using a motor-driven turbocharger and thus actively controlling an amount of flowing recirculation exhaust gas and pressure thereof.

19 Claims, 7 Drawing Sheets

[FIG. 3]
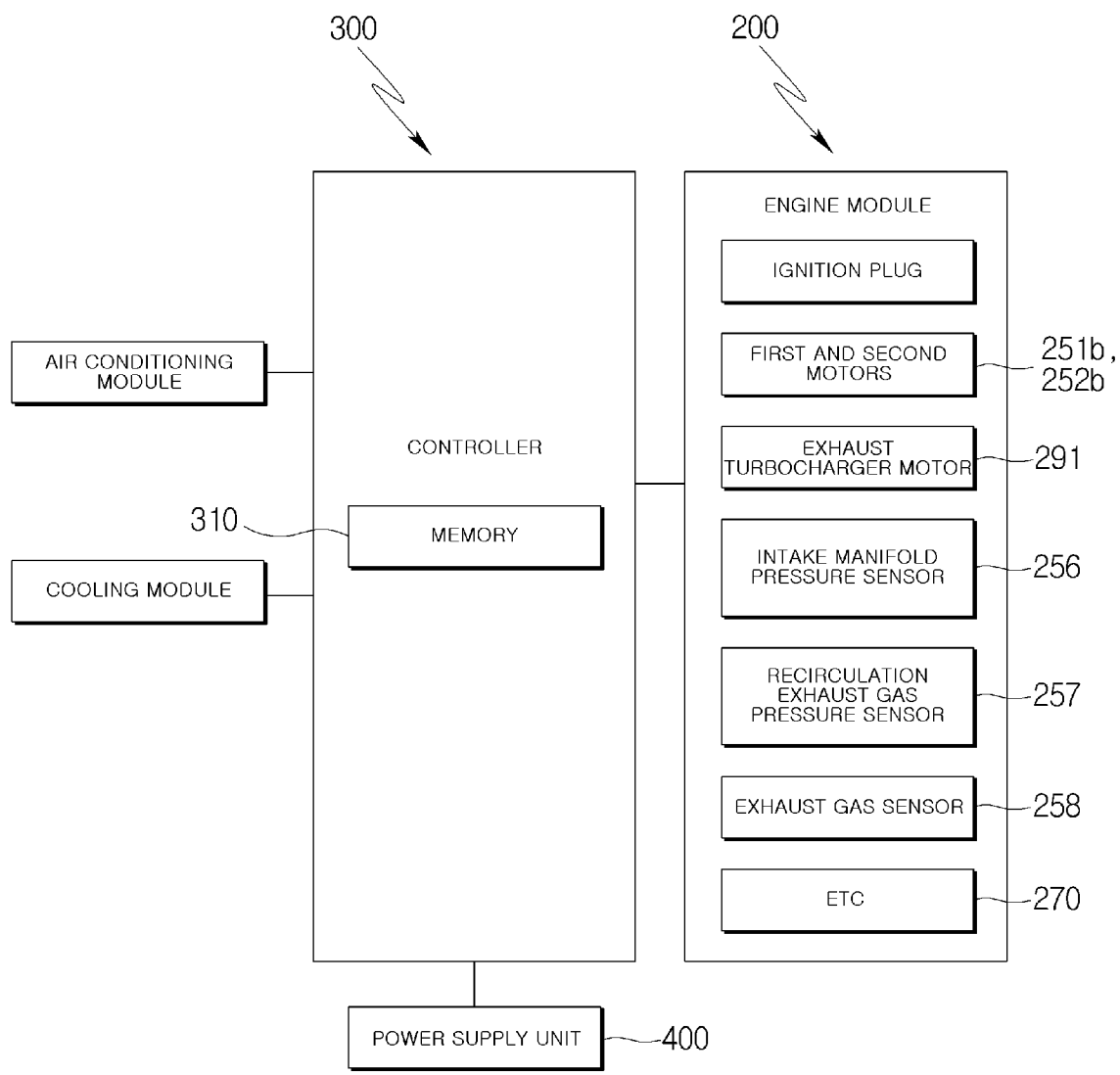

[FIG. 4]
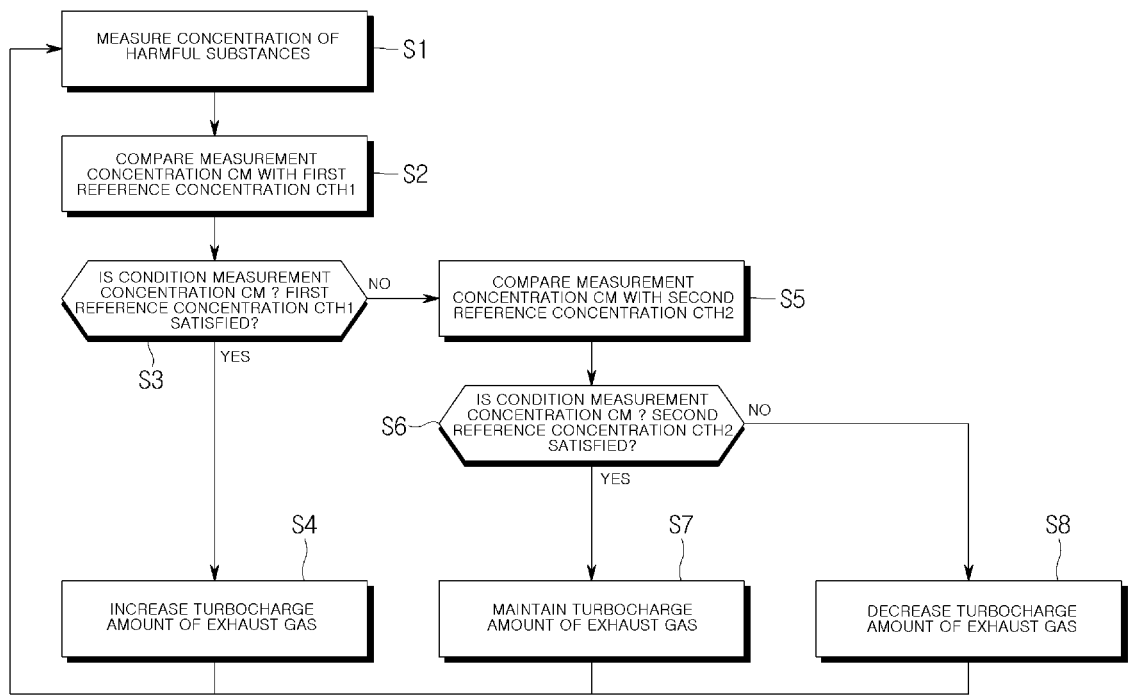

[FIG. 5]
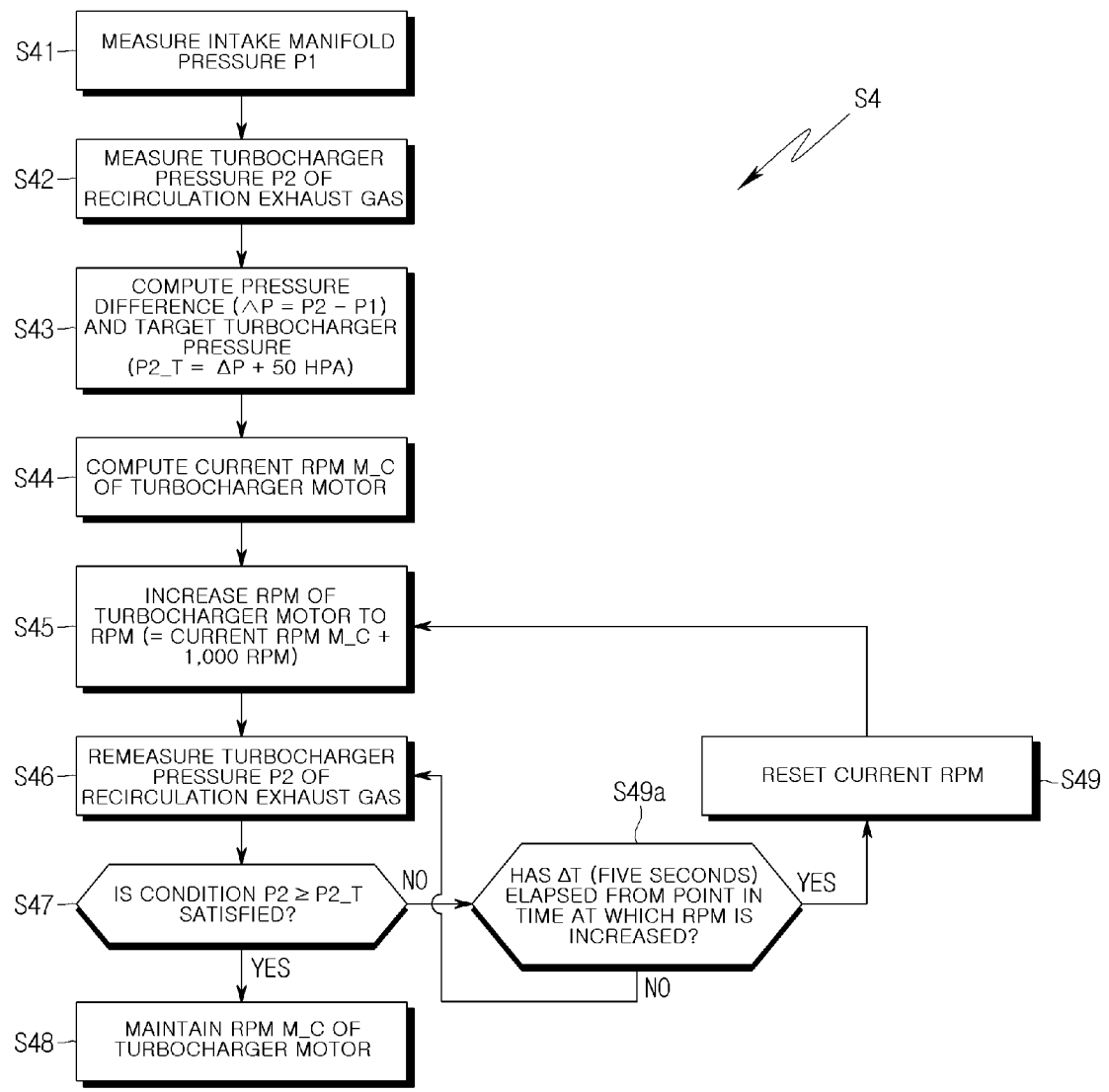

[FIG. 6]
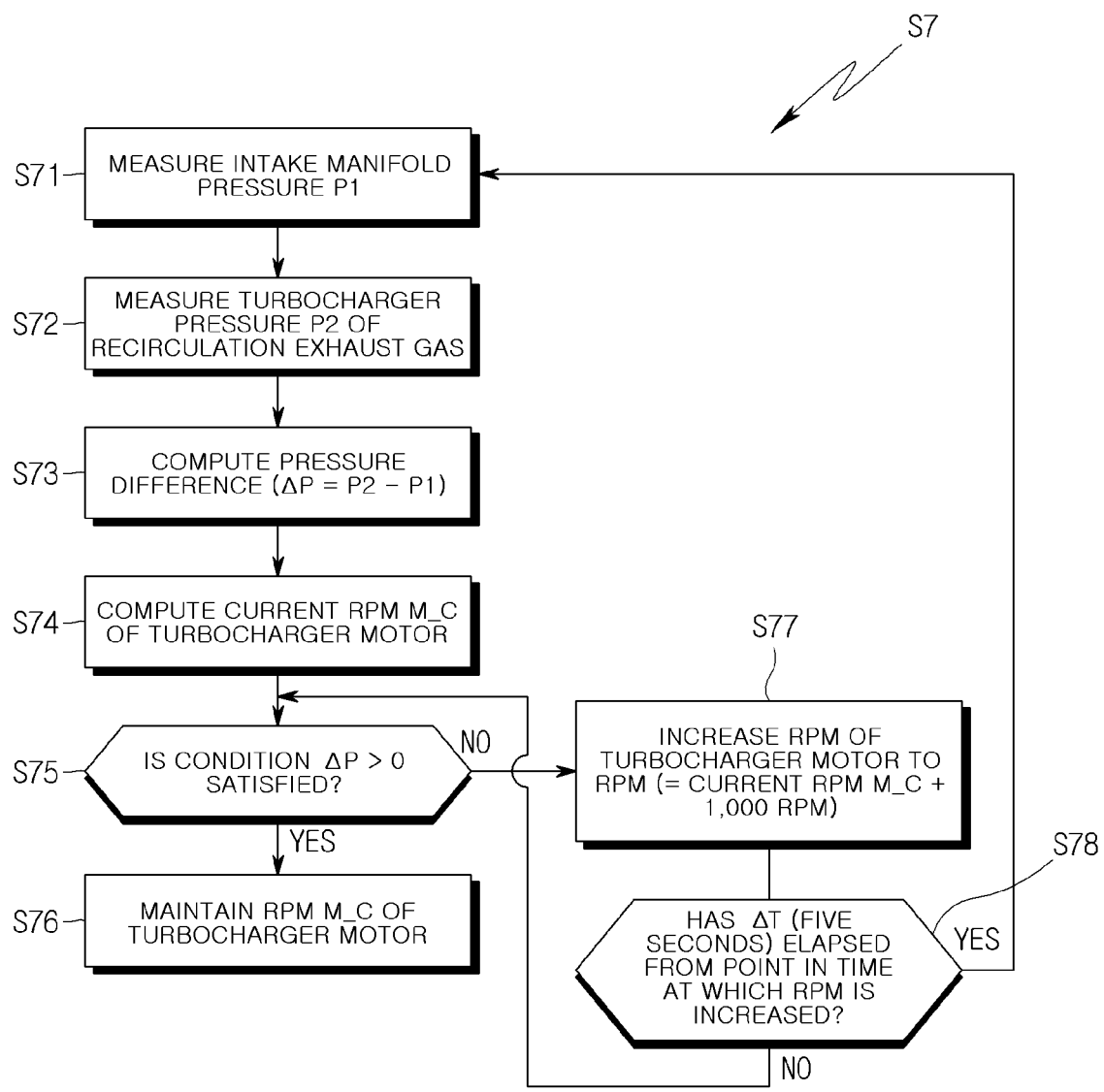

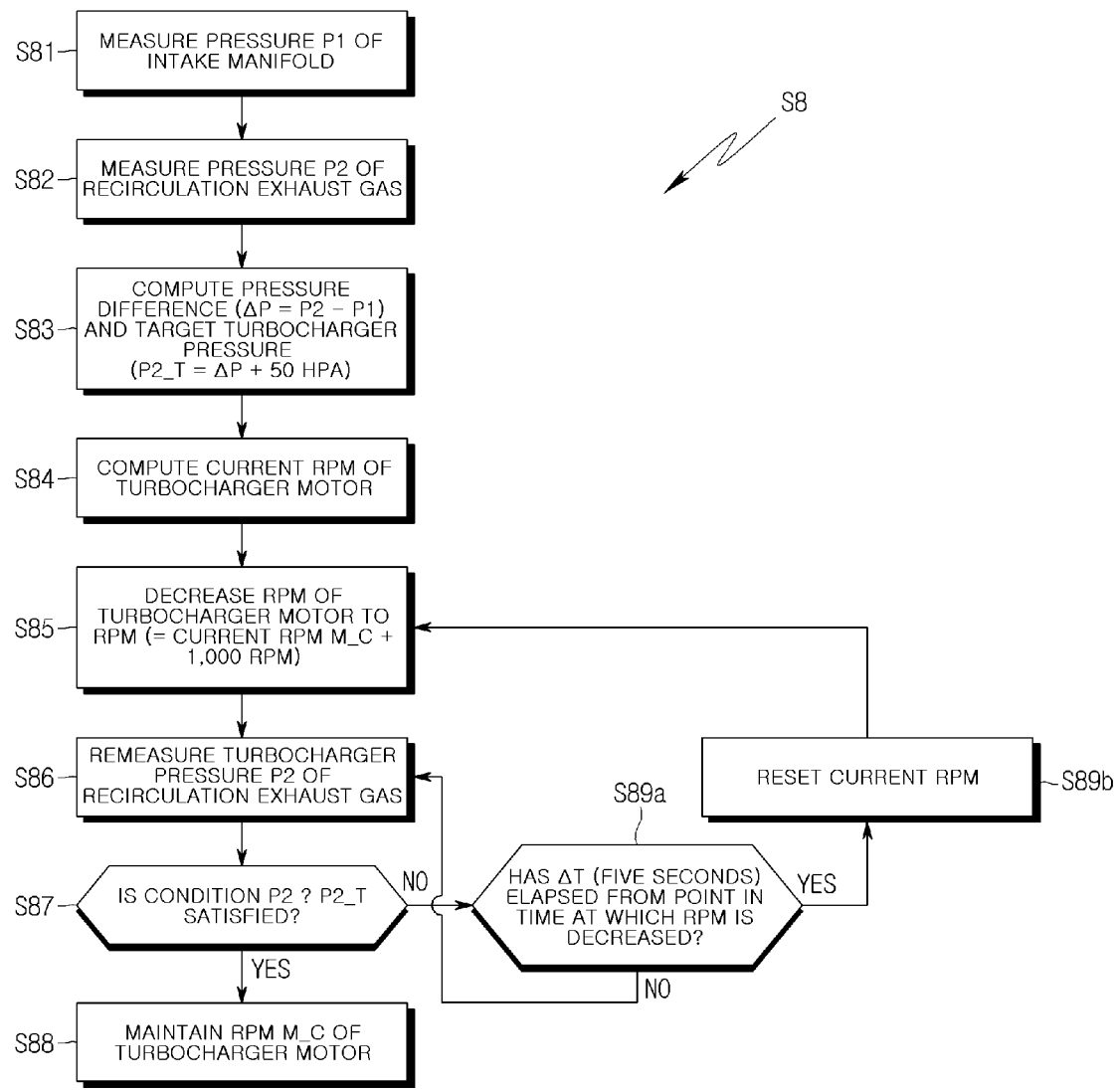
[FIG. 7]

GAS HEAT-PUMP SYSTEM

CROSS REFERENCE TO RELATED APPLICATION

The present application claims priority to Korean Patent Application No. 10-2019-0161650, filed on Dec. 6, 2019, the entire contents of which is incorporated herein for all purposes by this reference.

BACKGROUND OF THE INVENTION

Field of the Invention

The present disclosure relates to a gas heat-pump system and, more particularly, a gas heat-pump system capable of supplying recirculation exhaust gas using a motor-driven turbocharger and thus actively controlling an amount of flowing recirculation exhaust gas and pressure thereof.

Description of the Related Art

A heat-pump system is a system that is capable of performing a cooling or heating operation through a refrigeration cycle, and operates in cooperation with a hot water supply apparatus or a cooling and heating apparatus.

That is, hot water is produced or air conditioning for cooling and heating is performed using a heat source that is obtained as a result of heat exchange occurring between cooling refrigerant in the refrigeration cycle and a predetermined heat storage medium.

Generally, a configuration for the refrigeration cycle requires that a compressor compressing refrigerant, a condenser condensing the refrigerant compressed by the compressor, an expansion device decompressing the refrigerant condensed by the condenser, and an evaporator evaporating the decompressed refrigerant are included.

The heat-pump systems are categorized into electric heat-pump systems and gas heat-pump systems according to a type of drive source for driving the compressor.

The electric heat-pump systems, which have a low load capacity, are suitable for family use.

The gas heat-pump systems, which have a high load capacity, are suitable for industrial use or for large buildings.

Therefore, instead of an electric motor, the gas heat-pump system uses a gas engine in order to drive a high capacity compressor suitable for this high load capacity.

The gas heat-pump system is configured to include an engine that burns a mixture of gaseous and air and (hereinafter referred to as a "fuel-to-air mixture") and thus generates a motive force, a fuel supply device, a mixer for mixing air and gaseous fuel, and a device for supplying the fuel-to-air mixture to the engine.

Since the gas heat pump system uses a motive force of the engine, which is generated by combusting the fuel-to-air mixture, harmful substances contaminating the atmosphere are contained in exhaust gas generated in a process of combusting the fuel-to-air mixture.

Exhaust gas recirculation (EGR) technology in which a portion of the exhaust gas is resupplied to an intake line of the engine is generally employed as a means of reducing an amount of generated harmful substance contained in the exhaust gas.

Korean Patent Application Publication No. 10-2018-0015900 (Patent Document 1) discloses a turbocharger that rotates an impeller using a turbine, as a drive source, which is rotated with the exhaust gas, and an exhaust gas recirculation device that recirculates a portion of the exhaust discharged through the turbine to the intake line.

With a configuration disclosed in Patent Document 1, an amount of flowing recirculation exhaust gas is simply adjusted only with an exhaust gas recirculation valve.

Therefore, in a case where pressure of the exhaust gas that is discharged and recirculated is lower than pressure of the intake line, recirculation is impossible.

In addition, with the configuration disclosed in Patent Document 1, an amount of the recirculation exhaust gas to be supplied cannot be controlled according to a concentration of harmful substances contained in the discharged exhaust gas or an amount of discharged substance. For this reason, the engine cannot be efficiently operated.

The foregoing is intended merely to aid in the understanding of the background of the present disclosure, and is not intended to mean that the present disclosure falls within the purview of the related art that is already known to those skilled in the art.

DOCUMENT OF RELATED ART (Patent Document 1) Korean Patent Application Publication No. 10-2018-0015900

SUMMARY OF THE INVENTION

An objective of the present disclosure is to provide a gas heat-pump system capable of supplying recirculation exhaust gas using a motor-driven turbocharger and thus actively controlling an amount of flowing recirculation exhaust gas and pressure thereof.

Another objective of the present disclosure is to provide a gas heat-pump system capable of in real time monitoring a concentration of harmful substances contained in discharged exhaust gas and adjusting an amount of recirculation exhaust gas on the basis of a result of the monitoring. In the gas heat-pump system, an amount of generated harmful substance can be remarkably reduced and the operational efficiency of an engine can be improved.

According to an aspect of the present disclosure, there is provided a gas heat-pump system including: a compressor of an air conditioning module; a gas engine generating a drive force of the compressor; an exhaust gas turbocharger supplying at least a portion of exhaust gas discharged from the gas engine, as recirculation exhaust gas, to the gas engine; and a controller controlling operation of the exhaust gas turbocharger, wherein the exhaust gas turbocharger comprises: a turbocharger impeller applying pressure to the recirculation exhaust gas and supplying the resulting recirculation exhaust gas to the gas engine; and a turbocharger motor rotating the turbocharger impeller, and the controller performs control in such a manner that an rpm of the turbocharger motor is adjusted according to a concentration of harmful substances contained in the exhaust gas.

The gas heat-pump system may further including: an exhaust pipe through which the exhaust gas is discharged to the outside of the gas heat-pump system; an exhaust gas sensor attached to the exhaust pipe, the exhaust gas sensor being configured to sense the concentration of the harmful substances contained in the exhaust gas; and an exhaust bypass pipe branching off from the exhaust pipe upstream from a position where the exhaust gas sensor is attached, the exhaust bypass pipe being configured to guide the recirculation exhaust gas to the exhaust gas turbocharger, wherein the controller may receive a signal associated with the concentration of the harmful substances from the exhaust gas and may measure the concentration of the harmful substances.

In the gas heat-pump system, the harmful substances may include at least one of carbon monoxide, nitrogen oxide, and hydrocarbon.

In the gas heat-pump system, the controller may compare the measured concentration with a first reference concentration and may determine whether or not the measured concentration exceeds the first reference concentration, and when the measured concentration is equal to or higher than the first reference concentration, the controller may increase the rpm of the turbocharger motor and thus may increase a turbocharge amount of the recirculation exhaust gas.

The gas heat-pump system may further include: an intake manifold supplying a fuel-to-air mixture to the gas engine; an intake manifold pressure sensor sensing pressure of the fuel-to-air mixture within the intake manifold; and a recirculation exhaust gas pressure sensor sensing turbocharger pressure of the recirculation exhaust gas discharged from the exhaust gas turbocharger, wherein the controller may receive a signal associated with the pressure of the fuel-to-air mixture from the intake manifold pressure sensor and may measure the pressure of the fuel-to-air mixture, and the controller may receive a signal associated with pressure of the recirculation exhaust gas from the recirculation exhaust gas pressure sensor and may measure the turbocharger pressure of the recirculation exhaust gas supplied to the intake manifold.

In the gas heat-pump system, the controller may compute a pressure difference between the measured pressure of the fuel-to-air mixture and the measured turbocharger pressure of the recirculation exhaust gas, and may compute a target turbocharger pressure of the recirculation exhaust gas.

In the gas heat-pump system, the controller may compute a current rpm of the turbocharger motor and may increase the rpm of the turbocharger motor to a target rpm that is obtained by adding a predetermined increase to the computed current rpm.

In the gas heat-pump system, the predetermined increase may be 1,000 rpm.

In the gas heat-pump system, the controller may remeasure the turbocharger pressure of the recirculation exhaust gas through the recirculation exhaust gas and may determine whether or not the remeasured turbocharger pressure of the recirculation exhaust gas reaches the target turbocharger pressure, and when it is determined that the remeasured turbocharger pressure of the recirculation exhaust gas is equal to or higher than the target turbocharger pressure, the controller may maintain the target rpm to which the rpm of the turbocharger motor is increased.

In the gas heat-pump system, when it is determined that the remeasured turbocharger pressure of the recirculation exhaust gas is lower than the target turbocharger pressure, the controller may increase the rpm of the turbocharger motor to an rpm that is obtained by adding the predetermined increase to the target rpm.

In the gas heat-pump system, the controller may compare the measured concentration of the harmful substances with a first reference concentration and may determine whether or not the measured concentration thereof exceeds the first reference concentration, and when it is determined that the measured concentration thereof is lower than the first reference concentration, the controller may compare the measured concentration thereof with a second reference concentration that is lower than the first reference concentration.

In the gas heat-pump system, when it is determined that the measured concentration thereof is equal to or higher than the second reference concentration, the controller may maintain the rpm of the turbocharger motor and thus may cause the turbocharge amount of the recirculation exhaust gas to be maintained.

In the gas heat-pump system, when it is determined that the measured concentration thereof is lower than the second reference concentration, the controller may decrease an rpm of the turbocharger motor and thus may decrease the turbocharge amount of the recirculation exhaust gas.

The gas heat-pump system may further include: an intake manifold supplying a fuel-to-air mixture to the gas engine; an intake manifold pressure sensor sensing pressure of the fuel-to-air mixture within the intake manifold; and a recirculation exhaust gas pressure sensor sensing turbocharger pressure of the recirculation exhaust gas discharged from the exhaust gas turbocharger, wherein the controller may receive a signal associated with the pressure of the fuel-to-air mixture from the intake manifold pressure sensor and may measure the pressure of the fuel-to-air mixture, and the controller may receive a signal associated with pressure of the recirculation exhaust gas from the recirculation exhaust gas pressure sensor and may measure the turbocharger pressure of the recirculation exhaust gas.

In the gas heat-pump system, the controller may compute a pressure difference between the measured pressure of the fuel-to-air mixture and the measured turbocharger pressure of the recirculation exhaust gas, and may compute a target turbocharger pressure of the recirculation exhaust gas.

In the gas heat-pump system, the controller may compute a current rpm of the turbocharger motor and may decrease the rpm of the turbocharger motor to a target rpm that is obtained by abstracting a predetermined decrease from the computed current rpm.

In the gas heat-pump system, the predetermined decrease may be 1,000 rpm.

In the gas heat-pump system, the controller may remeasure the turbocharger pressure of the recirculation exhaust gas through the recirculation exhaust gas and may determine whether or not the remeasured turbocharger pressure of the recirculation exhaust gas reaches the target turbocharger pressure, and when it is determined that the remeasured turbocharger pressure of the recirculation exhaust gas is lower than the target turbocharger pressure, the controller may maintain the target rpm to which the rpm of the turbocharger motor is decreased.

In the gas heat-pump system, when it is determined that the remeasured turbocharger pressure of the recirculation exhaust gas is equal to or higher than the target turbocharger pressure, the controller may decrease the rpm of the turbocharger motor to an rpm that is obtained by additionally abstracting the predetermined decrease from the target rpm.

In the gas heat-pump system according to the present disclosure, the recirculation exhaust gas is supplied using the motor-driven turbocharger. Thus, the advantage of actively controlling the amount of the flowing recirculation exhaust gas and the pressure thereof can be achieved.

Furthermore, in the gas heat-pump system according to the present disclosure, the concentration of the harmful substances contained in the discharged exhaust gas is monitored in real time, and the amount of the recirculation exhaust gas is adjusted on the basis of a result of the monitoring. Thus, the advantage of remarkably reducing the amount of the generated harmful substance and improving the operational efficiency of the gas engine can be archived.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 3 is a functional block diagram illustrating a configuration of a controller of the gas heat-pump system according to the embodiment of the present disclosure; and FIGS. 4 to 7 are flowcharts illustrating a method of controlling the gas heat-pump system according to an embodiment of the present disclosure.

DETAILED DESCRIPTION OF THE INVENTION

Figure 1:
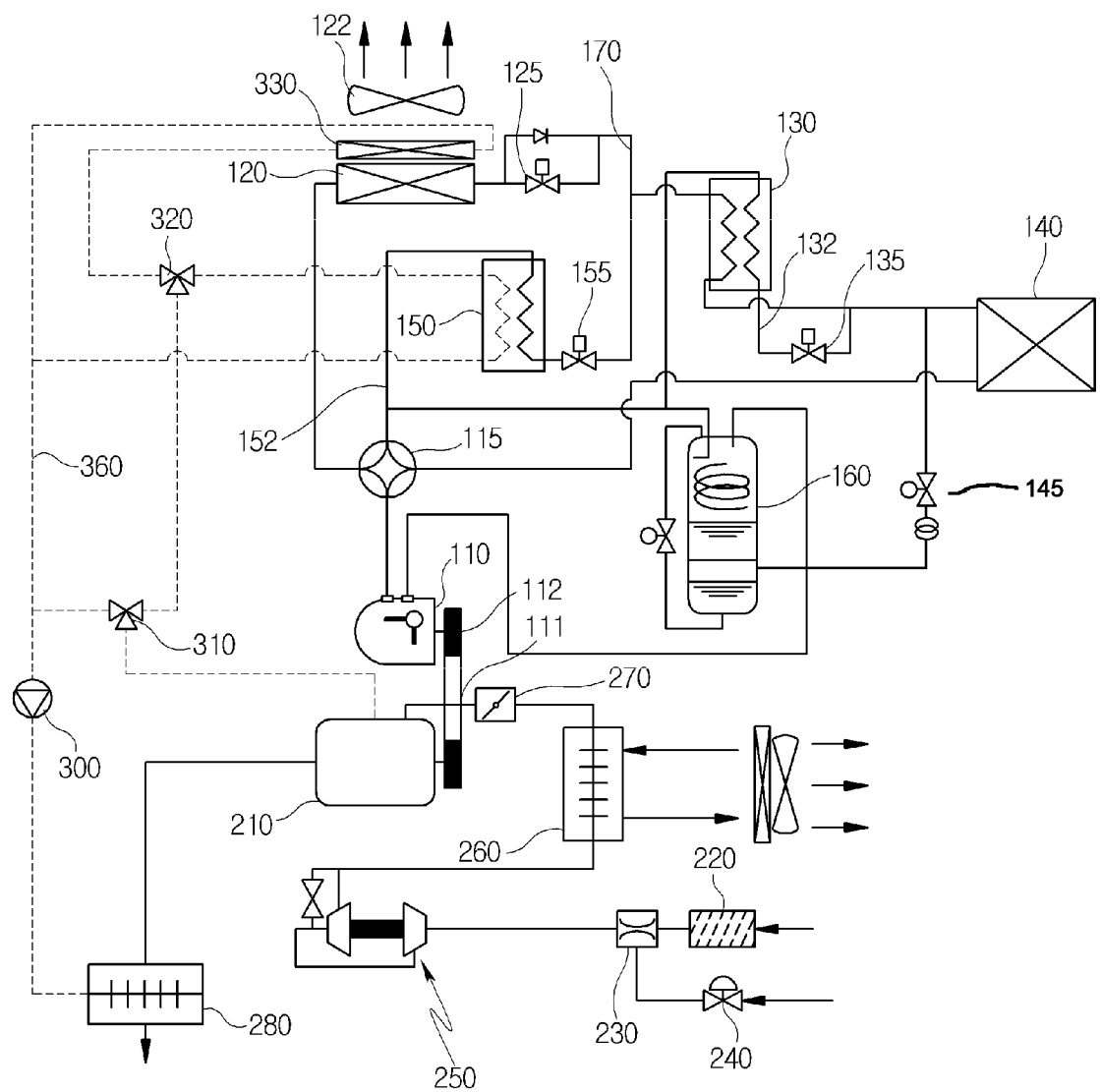
FIG. 1 is a view schematically illustrating a configuration of a gas heat-pump system according to an embodiment of the present disclosure.

Exemplary embodiments of the present disclosure will be described in detail below with reference to the accompanying drawings.

Various modifications can be made to the present disclosure, and thus various embodiments can be implemented. The resulting specific embodiments will also be described in detail below with reference to the drawings. This description is not intended to limit the present disclosure to the specific embodiments. All alterations, equivalents, and substitutes that are included within the technical idea of the present disclosure should be construed as falling within the scope of the present disclosure.

The terms first and second, and so on are used to describe various constituent elements, but should not be construed as imposing any limitation on the various constituent elements. These terms are used only to distinguish one element from another. For example, a first constituent element may be expressed as a second constituent element without departing from the scope of the present disclosure. In the same manner, the second constituent element may also be expressed as the first constituent element.

The phrase "and/or" is used to join two words, phrases, and sentences or to refer to one of the two words, phrases, and sentences.

It should be understood that, when a constituent element is referred to as being "coupled to" or "connected to" a different constituent element, this means that the constituent element may be directly coupled to or directly connected to the different constituent element or means that an intervening constituent element may be present therebetween. In contrast, it should be understood that, when a constituent element is referred to as being "directly coupled to" or "directly connected to" a different constituent element, this means that no intervening constituent element is present therebetween.

The terms used in the present specification are only for describing specific embodiments and are not intended to impose any limitation on the present disclosure. The indefinite article "a/an" is used to mean "one or more", not only one, except as distinctively expressed in context.

The term "include," "have" or the like in the present application is intended to indicate that a feature, a number, a step, an operation, a constituent element, a component, or combinations of these, which is described in the specification, is present, and thus should be understood not to preclude in advance the possibility that one or more other features, numbers, steps, operations, constituent elements, components, or combinations of these will be present or added.

Unless otherwise defined, each of the terms, including technical and scientific terms, which are used in the present specification, has the same meaning as is normally understood by a person of ordinary skill in the art to which the present invention pertains. The term as defined in commonly used dictionaries should be construed as having the same meaning in context in the art and, unless otherwise explicitly defined in the present specification, is not construed as having an ideal meaning or an excessively-formal meaning.

The embodiments will be provided below for illustrative purpose to help a person of ordinary skill in the art to get a full understanding of the present disclosure, and shapes, sizes, and the like of elements in the drawings can be exaggerated for clearer description.

Figure 2:
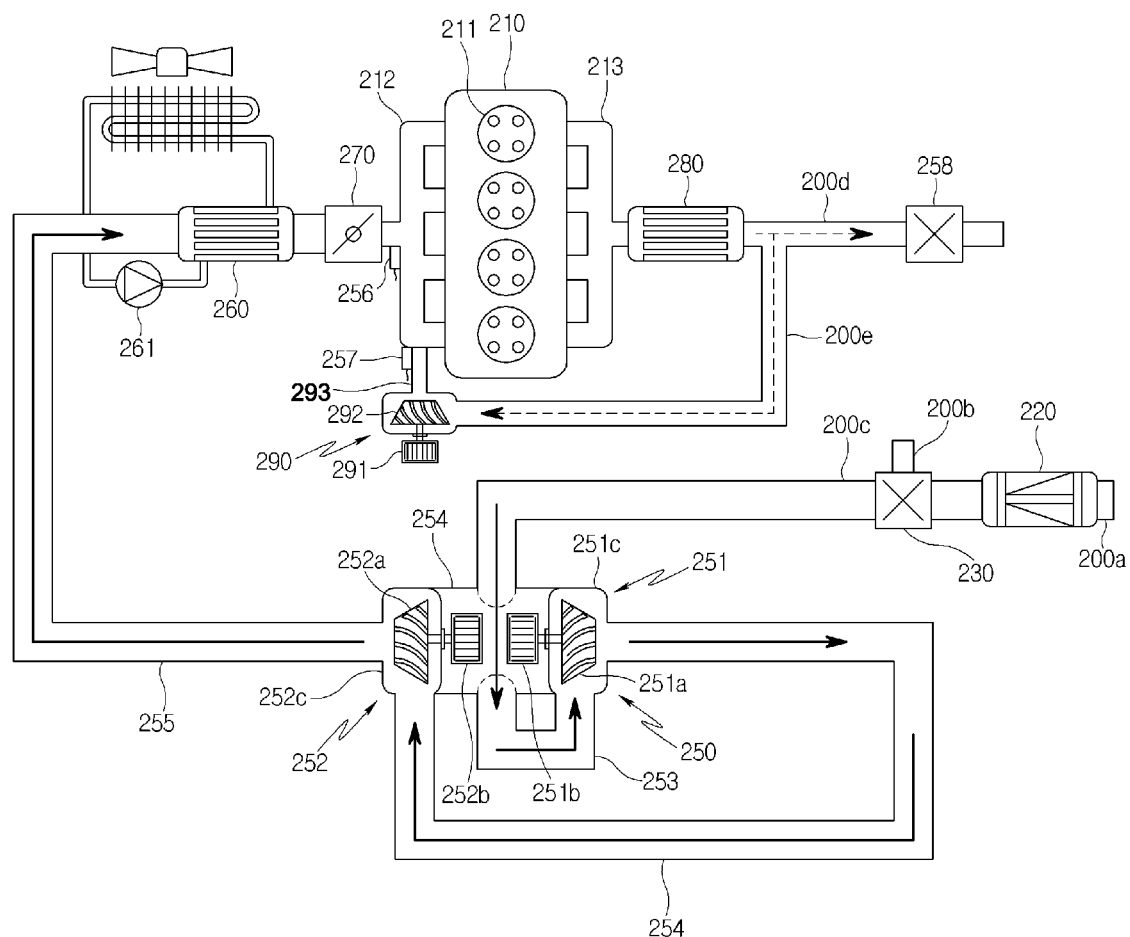
FIG. 2 is a view illustrating a detailed configuration of an engine module in FIG. 1.

FIG. 1 is a view schematically illustrating a configuration of a gas heat-pump system according to an embodiment of the present disclosure. FIG. 2 is a view illustrating a detailed configuration of an engine module in FIG. 1.

With reference to FIG. 1, a gas heat pump system according to an embodiment of the present disclosure includes an air conditioning module, an engine module, and a cooling module.

The air conditioning module includes a plurality of components that are necessary for a refrigerant cycle.

For example, the air conditioning module includes a compressor 110 and a four-way valve 115. The compressor 110 compresses refrigerant. The four-way valve 115 switches a direction of the refrigerant compressed in the compressor 110.

The compressor 110 operates with a drive force generated by an engine 210 that will be described below, and serves to compress the refrigerant in a gaseous state and to discharge the resulting refrigerant.

A pulley and clutch assembly 112 is provided on a drive shaft of the compressor 110. The drive force generated by the engine 210 is transferred to the compressor 110 through a belt 111 and the pulley and clutch assembly 112.

In FIG. 1, a configuration in which the air conditioning module includes one compressor 110 is illustrated, but the air conditioning module may include a plurality of compressors 110, depending on a load capacity of an indoor air conditioning condenser unit.

The plurality of compressors 110 each have the pulley and clutch assembly 112 to which the drive force generated by the engine 210 is selectively transferred.

Furthermore, the air conditioning module may further include an outdoor heat exchanger 120 and an indoor heat exchanger 140.

The outdoor heat exchanger 120 is arranged within an outdoor air conditioning condenser unit that is installed outdoors, and the indoor heat exchanger 140 is arranged within the indoor air conditioning condenser unit that is installed indoors.

The refrigerant that passes through the four-way valve 115 flows to the outdoor heat exchanger 120 or the indoor heat exchanger 140.

Components other than the indoor heat exchanger 140 and an indoor expansion device 145 of the gas heat-pump system, which are illustrated in FIG. 1, are arranged outdoors, that is, are arranged within the outdoor air conditioning condenser unit.

In a case where the gas heat system operates in a cooling operation mode, the refrigerant passing through the four-way valve 115 flows toward the indoor heat exchanger 140 through the outdoor heat exchanger 120.

In contrast, in a case where the gas heat-pump system operates in a heating operation mode, the refrigerant passing through the four-way valve 115 flows toward the outdoor heat exchanger 120 through the indoor heat exchanger 140.

The air conditioning module may further include a refrigerant pipe 170 (a flow path indicated by a solid line) that connects the compressor 110, the outdoor heat exchanger 120, the indoor heat exchanger 140, and the like to each other and guides a flow of the refrigerant.

First, the configuration of the gas heat pump system operating in the cooling operation mode will be described below.

The refrigerant flowing to the outdoor heat exchanger 120 exchanges heat with outside air and thus is condensed. An outdoor fan 122 that blows the outside air into the outdoor heat exchanger 120 is arranged on one side thereof.

A main expansion device 125 for decompressing the refrigerant is provided to the exit side of the outdoor heat exchanger 120. For example, the main expansion device 125 may include an electronic expansion valve (EEV). The electronic expansion valve (EEV) is controlled using a pulse-width modulation method. In a case where a pulse increases (by a positive value), the degree of opening to which the main expansion device 125 is open is increased. In a case where the pulse decreases (by a negative value), the degree of opening to which the main expansion device 125 is open is decreased.

When performing a cooling operation, the main expansion device 125 is fully open, and thus an operation of decompressing the refrigerant is not performed.

A supercooling heat exchanger 130 for additionally cooling the refrigerant is provided to the exit side of the main expansion device 125. Then, a supercooling flow path 132 is connected to the supercooling heat exchanger 130. The supercooling flow path 132 branches off from a refrigerant pipe 170 and is connected to the supercooling heat exchanger 130.

Then, a supercooling expansion device 135 is installed on the supercooling flow path 132. The refrigerant flowing along the supercooling flow path 132 is decompressed while passing through the supercooling expansion device 135.

In the supercooling heat exchanger 130, heat exchange occurs between the refrigerant in the refrigerant pipe 170 and the refrigerant on the supercooling flow path 132. In a heat exchange process, the refrigerant in the refrigerant pipe 170 is supercooled, and the refrigerant on the supercooling flow path 132 absorbs heat.

The supercooling flow path 132 is connected to a gas-liquid separator 160. The refrigerant on the supercooling flow path 132, which exchanges heat in the supercooling heat exchanger 130, flows into the gas-liquid separator 160.

The refrigerant in the refrigerant pipe 170, which passes through the supercooling heat exchanger 130, flows toward the indoor air conditioning condenser unit, is decompressed in the indoor expansion device 145, and then evaporates in the indoor heat exchanger 140. The indoor expansion device 145 is installed within the indoor air conditioning condenser unit and is configured as the electronic expansion valve (EEV).

In addition, the refrigerant evaporating in the indoor heat exchanger 140 may pass through the four-way valve 115 and then may flow right into the gas-liquid separator 160.

Gaseous-phase refrigerant, resulting from refrigerant separation, is absorbed into the compressor 110.

The configuration of the gas heat pump system operating in the heating operation mode will be described below.

In a heating process, the refrigerant compressed in the compressor 110 flows to the indoor heat exchanger 140, and the refrigerant condensed in the indoor heat exchanger 140 flows to an auxiliary heat exchanger 150. A refrigerant branch pipe 152 is connected to the auxiliary heat exchanger 150.

An expansion valve 155 is provided on a portion, positioned to the entrance side of the auxiliary heat exchanger 150, of the refrigerant branch pipe 152. The expansion valve 155 decompresses the refrigerant while adjusting the flow of the refrigerant.

The auxiliary heat exchanger 150 is a heat exchanger in which heat exchange occurs between low pressure refrigerant and high temperature cooling water. Examples of the auxiliary heat exchanger 150 include a plate-type heat exchanger.

The refrigerant passing through the auxiliary heat exchanger 150 may flow into the gas-liquid separator 160.

In the gas-liquid separator 160, the refrigerant passing through the auxiliary heat exchanger 150 is separated into gas and liquid. The gaseous-phase refrigerant, resulting from the refrigerant separation, is absorbed into the compressor 110.

The cooling module includes a cooling water pipe 360 (a flow path indicated by a dotted line) that guides a flow of cooling water for cooling the engine 210 that will be described below.

A cooling water pump 300, a plurality of flow switch units 310 and 320, and a radiator 330 are installed on the cooling water pipe 360. The cooling water pump 300 generates a flow force of the cooling water. The plurality of flow switch units 310 and 320 switch a flow direction of the cooling water. The radiator 300 cools the cooling water.

The plurality of flow switch units 310 and 320 include a first flow switch unit 310 and a second flow switch unit 320. As an example, the first flow switch unit 310 and the second flow switch unit 320 each have a three-way valve.

The radiator 330 is positioned to one side of the outdoor heat exchanger 120. The cooling water in the radiator 330 exchanges heat with the outside air by driving the outdoor fan 122 and, during this heat exchange process, is cooled.

When the cooling water pump 300 is driven, the cooling water passes through the engine 210 and an exhaust gas heat exchanger 280 and selectively flows into the radiator 330 or the auxiliary heat exchanger 150 through the first flow switch unit 310 and the second flow switch unit 320.

The engine module includes the engine 210 and various components for supplying a fuel-to-air mixture to the engine 210.

The engine module includes a mixer 230 that is arranged to the entrance side of the engine 210 and mixes air and gaseous fuel.

An air filter 220 and a zero governor 240 are installed upstream from the mixer 230. The air filter 220 supplies purified air to the mixer 230 through an air pipe 200*a*. The zero governor 240 supplies gaseous fuel at predetermined pressure or lower through a fuel pipe 200*b*.

The zero governor 240 is a device that uniformly adjusts output pressure regardless of a magnitude of entrance pressure of the gaseous fuel or a change in an amount of flow and supplies the resulting gaseous fuel.

In the mixer 230, the air passing through the air filter 220 and the gaseous fuel discharged from the zero governor 240 are mixed to generate the fuel-to-air mixture. The generated fuel-to-air mixture is supplied to the engine 210 through a mixture device 200c.

The engine module may further include a turbocharger 250 and an adjustment unit 270 that are arranged between the mixer 230 and the engine 210.

The turbocharger 250 applies pressure to the fuel-to-air mixture to increase the density of the fuel-to-air mixture and supplies the resulting fuel-to-air mixture to the engine 210. The turbocharger 250 is used to provide a higher output than in a natural aspirated engine.

As illustrated in FIG. 1, the turbocharger 250 applies pressure to the fuel-to-air mixture that flows thereinto through turbocharger entrance pipe 253 (in FIG. 2) after being generated as a result of the mixer 230 mixing air and gaseous fuel, and discharges the resulting fuel-to-air mixture toward the engine 210 through a turbocharger exit pipe 255 (in FIG. 2).

For example, as illustrated in FIG. 2, the turbocharger 250 includes a first turbocharger 251 and a second turbocharger 252. The first turbocharger 251 and the second turbocharger 252 apply first-level pressure to the fuel-to-air mixture generated by the mixer 230, and directly supply the resulting fuel-to-air mixture to the engine 210, or apply second-level pressure to the fuel-to-air mixture to which the first-level pressure is applied and supply the resulting fuel-to-air mixture to the engine 210.

The first turbocharger 251 and the second turbocharger 252 have motors 251b and 252b and impellers 251a and 252a, respectively. The motors 251b and 252b have the same shape and structure. The impellers 251a and 252a have the same shape and structure.

The turbocharger 250 is configured to include the motors 251b and 252b having the same shape and structure and the impellers 251a and 252a having the same shape and structure. Thus, the turbocharger 250 has the advantages of possibly achieving miniaturization and efficiency over a turbocharger configured to include one motor and one impeller.

The first motor 251b and the second motor 252b are configured to be accommodated within the motor housing 254 that are shared between the first motor 251b and the second motor 252b and to be cooled by the fuel-to-air mixture that flows into the motor housing 254.

The first impeller 251a and the second impeller 252a are rotatably supported within a first housing 251c and a second housing 252c, respectively, each of which has a flow path for the fuel-to-air mixture.

The adjustment unit 270 is arranged between the turbocharger 250 and the engine 210 and adjusts an amount of the compressed fuel-to-air mixture that is to be supplied to the engine 210.

Examples of the adjustment unit 270 include a valve that employs an electronic throttle control (ETC) scheme. An embodiment in which the ETC valve capable of being electronically controlled is used as the adjustment unit 270 will be described below. However, the present disclosure is not limited to this embodiment.

In this manner, the mixer 230 mixes gaseous fuel and air to generate the fuel-to-air mixture. The turbocharger 250 applies high pressure to the generated fuel-to-air mixture, and then the resulting fuel-to-air mixture is supplied to the engine 210.

At this point, an amount of the high pressure fuel-to-air mixture that is to be supplied to the engine 210 is precisely controlled with the ETC valve 270, and thus an output of the engine 210 is controlled.

As described above, the fuel-to-air mixture passing through the turbocharger 250 is in high temperature and high pressure states. For this reason, an intercooler 260 is provided between the turbocharger 250 and the adjustment unit 270. The intercooler 260 lowers the temperature and pressure of the fuel-to-air mixture and supplies the resulting fuel-to-air mixture to a cylinder 211 of the engine 210.

For example, the intercooler 260 is configured in such a manner that heat exchange occurs between the fuel-to-air mixture to be supplied to the engine 210 and a portion of the cooling water to flow to the engine 210 or in such a manner that, as illustrated in FIG. 2, heat exchange occurs between the cooling water circulating through a separate water pump 261 in FIG. 2 and the fuel-to-air mixture.

The engine module may further include the exhaust gas heat exchanger 280 which is arranged to the exhaust outlet side of the engine 210 and in which heat exchange occurs between the cooling water and exhaust gas.

FIG. 2 is a view schematically illustrating a configuration of an engine module 200 in FIG. 1. A detailed configuration of the engine module 200 according to an embodiment of the present disclosure will be described below with reference to FIG. 2.

The engine module 200 of the gas heat-pump system according to the present disclosure may further include an exhaust gas supercharger 290 that supplies at least a portion of the exhaust gas discharged from the engine 210, as recirculation exhaust gas, to the engine 210.

The exhaust gas supercharger 290 serves to apply pressure to at least a portion of the exhaust gas discharged to an exhaust pipe 200d through an exhaust manifold 213 and to supply the resulting portion thereof, as the recirculation exhaust gas, to an intake manifold 212.

At this point, a turbocharge amount of the recirculation exhaust gas is actively adjusted within a range of 3 to 30% of a total amount of the exhaust gas.

In order to actively control the turbocharge amount of the recirculation exhaust gas, the exhaust gas turbocharger 290 is motor-driven.

To this end, the exhaust gas turbocharger 290 includes a turbocharger motor 291 of which an rpm is controllable according to a control signal of a controller 300.

An output shaft of the turbocharger motor 291 is connected to a turbocharger impeller 292, and thus the turbocharger impeller 292 is rotatably driven. The turbocharger impeller 292 applies pressure to the recirculation exhaust gas guided thereto through an exhaust bypass pipe 200e that will be described below, and then the resulting recirculation exhaust gas is supplied to the intake manifold 212 through an exit pipe 293.

At this point, the turbocharge amount of the recirculation exhaust gas, which is supplied to the intake manifold 212 through the exhaust gas turbocharger 290, is determined on the basis of a concentration of harmful substances within the exhaust pipe 200d.

Harmful substances contained in the exhaust gas are normally known to include carbon monoxide (CO), nitrogen oxide (NOx), and hydrocarbon (HC). According to the present disclosure, the turbocharge amount of the recirculation exhaust gas is controlled on the basis of a concentration of at least one of these harmful substances.

To this end, an exhaust gas sensor 258 sensing a concentration of harmful substances contained in the exhaust gas is provided on the exhaust pipe 200d.

The exhaust gas sensor 258 has the purpose of measuring the concentration of the harmful substances contained in the exhaust gas finally discharged to the outside. For this reason, the exhaust gas sensor 258 is desirably arranged most downstream from the exhaust pipe 200d.

According to the present disclosure, any exhaust gas 258 that is configured to possibly measuring the concentration of the harmful substances contained in the exhaust gas may be provided without restraint. The application of this modification example should fall within the scope of the present disclosure.

The exhaust bypass pipe 200e for guiding the recirculation exhaust gas to the exhaust gas turbocharger 290 is provided in the form of a pipe branching off from the exhaust pipe 200d.

In this case, the exhaust bypass pipe 200e is desirably positioned to branch off from the exhaust pipe 200d downstream from the exhaust gas heat exchanger 280.

The reason for this positioning is because the exhaust gas discharged from the exhaust manifold 213 normally has a temperature in the range of approximately 300 to 700° C. When the exhaust gas is supplied to the intake manifold 212 without being cooled, the density of the fuel-to-air mixture is decreased, thereby exerting an adverse effect on the efficiency of the engine 210.

Therefore, there is a need to sufficiently cool the exhaust gas for supply. To this end, the exhaust bypass pipe 200e is positioned to branch off from the exhaust pipe 200d downstream from the exhaust gas heat exchanger 280 in such a manner as to supply the exhaust gas, as the recirculation exhaust gas, that is cooled to approximately 70° C. while passing through the exhaust gas heat exchanger 280.

The turbocharger impeller 292 of the exhaust gas turbocharger 290 applies pressure to the recirculation exhaust gas guided thereto through the exhaust bypass pipe 200e, and then the resulting recirculation exhaust gas flows into the intake manifold 212 through the exit pipe 293 connecting an exit of the exhaust gas turbocharger 290 and the intake manifold 212 to each other.

In addition, a recirculation exhaust gas pressure sensor 257 is attached to the exit pipe 293. The recirculation exhaust gas pressure sensor 257 in real time senses pressure of the recirculation exhaust gas that is discharged from the exhaust gas turbocharger 290 and is supplied to the intake manifold 212.

Furthermore, an intake manifold pressure sensor 256, as normally known as a MAP sensor, is attached to the intake manifold 212. The intake manifold pressure sensor 256 in real time senses pressure of the fuel-to-air mixture that is supplied to the cylinder 211 of the engine 210.

According to the present disclosure, a configuration in which the turbocharge amount of the recirculation exhaust gas is controlled without a separate a valve member is employed. Therefore, the turbocharge amount of the recirculation exhaust gas, which is supplied through the exhaust gas turbocharger 290, is controlled with a pressure difference, as a variable, between turbocharger pressure sensed by the recirculation exhaust gas pressure sensor 257 and the pressure of the fuel-to-air mixture, which is sensed by the intake manifold pressure sensor 256.

That is, as will be described below, in a case where the turbocharge amount of the recirculation exhaust gas needs to be increased, the turbocharge amount of the recirculation exhaust gas is controlled by increasing an rpm of the turbocharger motor 291 of the exhaust gas turbocharger 290 and thus increasing the pressure difference. Conversely, in a case where the turbocharge amount of the recirculation exhaust gas needs to be decreased, the turbocharge amount of the recirculation exhaust gas is controlled by decreasing the rpm of the turbocharger motor 291 of the exhaust gas turbocharger 290 and thus decreasing the pressure difference.

A specific control method and configuration will be described below with reference to FIGS. 4 to 7.

FIG. 3 is a functional block diagram illustrating a configuration of the controller 300 of the gas heat-pump system according to the embodiment of the present disclosure. FIGS. 4 to 7 are flowcharts illustrating a method of controlling the gas heat-pump system according to an embodiment of the present disclosure.

The method of controlling the gas heat-pump system according to the present disclosure will be described below with a focus on the controller 300.

As illustrated, the controller 300 is electrically connected to the air conditioning module, the cooling module, a power supply unit 400, and the engine module 200 and generates signals for controlling these components.

First, in a state where the gas heat-pump system is stopped, when a system operation signal is input through an operation unit that is not illustrated, the controller 300 generates signals for operating the air conditioning module, the cooling module, and the engine module 200, receives necessary electric power from the power supply unit 400, and supplies the received electric power to the air conditioning module, the cooling module, and the engine module 200.

A specific method and configuration in which the controller 300 controls the air conditioning module and the cooling module are known in the art, and therefore detailed descriptions thereof are omitted.

An operational condition for operating the engine module 200 is read from a memory 310. Specifically, control is performed in such a manner that the air pipe 200a and the fuel pipe 200b, which are described above, are open, and that air and fuel are thus introduced from the air pipe 200a and the fuel pipe 200b, respectively, and are mixed in the mixer 230.

In addition, in order to drive the turbocharger 250, the controller 300 performs control in such a manner that electric power is supplied to the first motor 251b and the second motor 252b. In this case, the controller 300 performs control in such a manner that the first motor 251b and the second motor 252b operate independently of each other.

When the fuel-to-air mixture to which pressure is applied is supplied to the engine 210, the controller 300 transmits an ignition signal to an ignition plug in accordance with a stroke of each cylinder 211 and ignites the fuel-to-air mixture supplied to each cylinder 211.

The controller 300 adjusts electric power that is supplied to the turbocharger motor 291 of the exhaust gas turbocharger 290 and thus controls the rpm of the turbocharger motor 291. As will be described below, the controller 300 performs control in such a manner that the rpm of the turbocharger motor 291 is increased or decreased according to the concentration of the harmful substances contained in the exhaust gas.

In addition, the controller 300 is electrically connected to the intake manifold pressure sensor 256, the recirculation exhaust gas pressure sensor 257, and the exhaust gas sensor 258 and in real time monitors the pressure of the fuel-to-air mixture, the turbocharger pressure of the recirculation exhaust gas, the concentration of the harmful substances contained in the exhaust gas, and the like through electric signals received from these components.

In addition, the controller 300 is electrically connected to an actuator of the ETC valve 270. When the output of the engine 210 is increased or decreased, the actuator adjusts the degree of opening to which the ETC valve 270 is open, according to a control signal of the controller 300, and thus increases or decreases the output of the engine 210.

A specific process of controlling the engine module 200 according to a required load ratio of the air conditioning module will be described below.

First, the controller 300 receives a signal associated with the concentration of the harmful substances from the exhaust gas sensor 258 and measures the concentration of the harmful substances (S1).

The harmful substances here include at least one of carbon monoxide, nitrogen oxide, and hydrocarbon. The exhaust gas sensor 258 generates an electric signal associated with the concentration of these substances and transfers the generated electric signal to the controller 300. The controller 300 measures the concentration of the harmful substances on the basis of the transferred electric signal.

Next, the controller 300 compares a measurement concentration Cm with a preset first reference concentration Cth1 (S2).

The first reference concentration Cth1 is secured by retrieving data that are stored in advance in the above-mentioned memory 310. The first reference concentration Cth1 refers to a numerical value above which the concentration of the harmful substances contained in the exhaust gas falls out of an acceptable range and serves as a reference variable above which control for lowering an exhaust gas emission level needs to be performed.

Subsequently, the controller 300 determines whether or not the measurement concentration Cm exceeds the first reference concentration Cth1 (S3).

When it is determined that the measurement concentration Cm is equal to or higher than the first reference concentration Cth1, the controller 300 increases the rpm of the turbocharger motor 291 of the exhaust gas turbocharger 290 and thus increases the turbocharge amount of the recirculation exhaust gas (S4).

More specifically, as illustrated in FIG. 5, in order to increase the turbocharge amount of the recirculation exhaust gas, first, the controller 300 receives a signal associated with the pressure of the fuel-to-air mixture from the intake manifold pressure sensor 256 and measures pressure P1 of the fuel-to-air mixture (S41).

Next, the controller 300 receives a signal associated with the pressure of the recirculation exhaust gas from the recirculation exhaust gas pressure sensor 257 and measures turbocharger pressure P2 of the recirculation exhaust gas that is supplied from the intake manifold 212 (S42).

The controller 300 computes a pressure difference ($\Delta P = P2 - P1$) corresponding to a difference in value between the measured pressure P1 of the fuel-to-air mixture and the turbocharger pressure P2 and computes a target turbocharger pressure P2_t for increasing the turbocharge amount of the recirculation exhaust gas (S43).

The target turbocharger pressure P2_t here is computed as a value that is obtained by adding a predetermined pressure increase to a computed pressure difference ($\Delta P$). The predetermined pressure increase is desirably 50 hPa.

When the pressure difference and the target turbocharger pressure P2_t are computed, the controller 300 computes a current rpm M_c of the turbocharger motor 291 of the exhaust gas turbocharger 290 (S44).

An arbitrary device known in the art may be used to compute the rpm of the turbocharger motor 291. The rpm of the turbocharger motor 291 is desirably computed in a manner that does not use a sensor.

When the current rpm M_c of the turbocharger motor 291 is computed, the controller 300 increases the rpm of the turbocharger motor 291 to a target rpm that is obtained by adding a predetermined increase to the computed current rpm M_c (S45).

The predetermined increase here is desirably 1,000 rpm.

When the rpm of the turbocharger motor 291 is completely increased, the controller 300 remeasures the turbocharger pressure P2 of the recirculation exhaust gas through the recirculation exhaust gas pressure sensor 257 (S46).

The controller 300 determines whether or not the remeasured turbocharger pressure P2 reaches the target turbocharger pressure (S47).

When it is determined that the remeasured turbocharger pressure P2 is equal to or higher than the target turbocharger pressure P2_t, the target rpm to which the rpm of the turbocharger motor 291 is increased is maintained (S48).

In a state where the target rpm to which the target rpm of turbocharger motor 291 is increased is maintained and thus the turbocharge amount of the recirculation exhaust gas is increased, the controller 300 returns to Step S1, and again measures the concentration of the harmful substances.

When it is determined in Step S47 that the remeasured turbocharger pressure P2 is lower than the target turbocharger pressure P2_t, the controller 300 determines whether or not a predetermined time interval ($\Delta t$) has elapsed after Step S45 is performed (S49a).

The predetermined time interval ($\Delta t$) is desirably five seconds.

When it is determined that the predetermined time interval ($\Delta t$) has not elapsed, the controller 300 returns to Steps S46 and S47 and again determines whether or not the target turbocharger pressure is reached.

When it is determined that the predetermined time interval ($\Delta t$) has elapsed, the current rpm is reset (S49b).

Next, the controller 300 returns to Step S45 and performs control in such a manner that the rpm of the turbocharger motor 291 is additionally increased to an rpm that is obtained by adding a predetermined increase to an rpm to which the current rpm is reset.

When it is determined in Step S3 that the measurement concentration Cm is lower than the first reference concentration Cth1, the controller 300 compares the measurement concentration Cm with a second reference concentration Cth2 and determines whether or not the measurement concentration Cm exceeds the second reference concentration Cth2 (S5 and S6).

The second reference concentration Cth2 here corresponds to a value that is smaller than the first reference concentration Cth1, and serves as a basis for determining whether the turbocharge amount of the recirculation exhaust gas is maintained or decreased.

That is, when equal to the second reference concentration Cth2, the concentration of the harmful substances contained in the exhaust gas that is currently discharged has a numerical value at or below which the exhaust gas emission is not subject to legal regulation. Thus, the turbocharge amount of the recirculation exhaust gas that is supplied to the engine 210 can be reduced and the turbocharger motor 291 can operate at a low rpm, thereby decreasing power consumption.

Like the first reference concentration Cth1, the second reference concentration Cth2 is secured by reading data that is stored in advance in the above-mentioned memory 310.

When it is determined in Step S6 that the measurement concentration Cm is equal to or higher than the second reference concentration Cth2, the controller 300 performs control in such a manner that a current rpm of the turbocharger motor 291 is maintained (S7).

That is, the control is performed in such a manner that the turbocharge amount of the recirculation exhaust gas that is supplied from the exhaust gas turbocharger 290 is maintained at a current state.

More specifically, as illustrated in FIG. 7, in order to maintain the turbocharge amount of the recirculation exhaust gas, first the controller 300 receives the signal associated with the pressure of the fuel-to-air mixture from the intake manifold pressure sensor 256 and measures the pressure P1 of the fuel-to-air mixture (S71).

Next, the controller 300 receives a signal associated with the pressure of the recirculation exhaust gas from the recirculation exhaust gas pressure sensor 257 and measures the turbocharger pressure P2 of the recirculation exhaust gas that is supplied from the intake manifold 212 (S42).

The controller 300 computes the pressure difference ($\Delta P = P2-P1$) that corresponds to the difference in value between the measured pressure P1 of the fuel-to-air mixture and the measured turbocharger pressure P2 (S73).

When the pressure difference is computed, the controller 300 computes the current rpm M_c of the turbocharger motor 291 of the exhaust gas turbocharger 290 (S74).

As described above, an arbitrary device known in the art may be used to compute the rpm of the turbocharger motor 291. The rpm of the turbocharger motor 291 is desirably computed in a manner that does not use a sensor.

When the current rpm M_c of the turbocharger motor 291 is computed, the controller 300 determines whether or not the computed pressure difference ($\Delta P$) has a numerical value of 0 or less (S75).

The fact that the pressure difference ($\Delta P$) has a value of 0 or less means a state where the turbocharger pressure P2 is lower than the pressure P1 of the fuel-to-air mixture, that is, that the fuel-to-air mixture flows backward toward the exhaust gas turbocharger 290.

Therefore, when it is determined in Step S75 that the computed pressure difference ($\Delta P$) has a numerical value of greater than 0, the controller 300 determines that operation in a normal state is in progress, and performs control in such a manner that the turbocharger motor 291 operates at the current rpm M_c (S76).

When it is determined in Step S75 that the computed pressure difference $\Delta P$ has a numerical value of 0 or less, in order to increase the turbocharger pressure P2, the controller 300 increases the rpm of the turbocharger motor 291 to a target rpm that is obtained by adding a predetermined increase to the current rpm M_c of the turbocharger motor 291 (S77).

The predetermined increase here is desirably 500 rpm.

Subsequently, the controller 300 determines whether or not the predetermined time interval ($\Delta t$) has elapsed from the point in time at which the rpm of the turbocharger motor 291 is increased (S78). (S78)

The predetermined time interval ($\Delta t$) is desirably five seconds.

When it is determined that the predetermined time interval ($\Delta t$) has not elapsed, the controller 300 returns to Step S75 and again determines the pressure difference ($\Delta P$).

When it is determined that the predetermined time interval ($\Delta t$) has elapsed, the controller 300 returns to Step S71 and again performs Step S71 and steps subsequent thereto.

When it is determined in Step S6 that the measurement concentration Cm is lower than the second reference concentration (Cth2), the controller 300 decreases the rpm of the turbocharger motor 291 of the exhaust gas turbocharger 290 and thus decreases the turbocharge amount of the recirculation exhaust gas (S8).

More specifically, as illustrated in FIG. 7, in order to decrease the turbocharge amount of the recirculation exhaust gas, first, the controller 300 receives the signal associated with the pressure of the fuel-to-air mixture from the intake manifold pressure sensor 256 and measures the pressure P1 of the fuel-to-air mixture (S81).

Next, the controller 300 receives the signal associated with the pressure of the recirculation exhaust gas from the recirculation exhaust gas pressure sensor 257 and measures the turbocharger pressure P2 of the recirculation exhaust gas that is supplied from the intake manifold 212 (S82).

The controller 300 computes a pressure difference ($\Delta P = P2-P1$) corresponding to the difference in value between the measured pressure P1 of the fuel-to-air mixture and the turbocharger pressure P2 and computes the target turbocharger pressure P2_t for decreasing the turbocharge amount of the recirculation exhaust gas (S83).

The target turbocharger pressure P2_t here is computed as a value that is obtained by subtracting a predetermined pressure decrease to the computed pressure difference ($\Delta P$). The predetermined pressure decrease is desirably 50 hPa.

When the pressure difference and the target turbocharger pressure P2_t are computed, the controller 300 computes the current rpm M_c of the turbocharger motor 291 of the exhaust gas turbocharger 290 (S84).

As described above, an arbitrary device known in the art may be used to compute the rpm of the turbocharger motor 291. The rpm of the turbocharger motor 291 is desirably computed in a manner that does not use a sensor.

When the current rpm M_c of the turbocharger motor 291 is computed, the controller 300 decreases the rpm of the turbocharger motor 291 to a target rpm that is obtained by subtracting a predetermined decrease from the computed current rpm M_c (S85).

The predetermined decrease here is desirably 1,000 rpm.

When the rpm of the turbocharger motor 291 is completely decreased, the controller 300 remeasures the turbocharger pressure P2 of the recirculation exhaust gas through the recirculation exhaust gas pressure sensor 257 (S86).

The controller 300 determines whether or not the remeasured turbocharger pressure P2 reaches the target turbocharger pressure (S87).

When it is determined that the remeasured turbocharger pressure P2 is lower than the target turbocharger pressure P2_t, the target rpm to which the rpm of the turbocharger motor 291 is decreased is maintained (S48).

In a state where the target rpm to which the rpm of the turbocharger motor 291 is decreased is maintained and thus the turbocharge amount of the recirculation exhaust gas is increased, the controller 300 returns to Step S1, and again measures the concentration of the harmful substances.

When it is determined in step S87 that the remeasured turbocharger pressure P2 is equal to or higher than the target turbocharger pressure P2_t, the controller 300 determines whether or not the predetermined time interval ($\Delta t$) has elapsed after Step S85 is performed (89*a*).

The predetermined time interval ($\Delta t$) is desirably five seconds.

When it is determined that the predetermined time interval ($\Delta t$) has not elapsed, the controller 300 returns to Steps S86 and S87 and again determines whether or not the target turbocharger pressure is reached.

When it is determined that the predetermined time interval ($\Delta t$) has elapsed, the current rpm is reset (S89*b*).

Next, the controller 300 returns to Step S85 and performs control in such a manner that the rpm of the turbocharger motor 291 is additionally decreased to an rpm that is obtained by additionally subtracting a predetermined decrease from an rpm from which the current rpm is reset.

Accordingly, from the above-described technical configurations of the embodiments of the present disclosure, it would be apparent to a person of ordinary skill to which the present disclosure pertains that specific embodiments other than the above-described embodiment of the present disclosure will be implemented without departing the technical idea and necessary features of the present disclosure.

Therefore, it should be understood that the above-described embodiments are illustrative and non-restrictive in all respects. The scope of the present disclosure is defined in the following claims rather than the detailed description provided above. All alterations, modifications, and the like that are derived from the following claims and equivalents thereof should be interpreted as being included within the scope of the present disclosure.

What is claimed is:

1. A gas heat-pump system, comprising:
   a compressor of an air conditioning module;
   a gas engine that generates a drive force of the compressor;
   an exhaust pipe through which exhaust gas is discharged to an outside of the gas engine;
   an exhaust gas turbocharger that supplies at least a portion of the exhaust gas in the exhaust pipe, as recirculation exhaust gas, to the gas engine;
   an exhaust bypass pipe that branches off from the exhaust pipe, and configured to guide the recirculation exhaust gas to the exhaust gas turbocharger; and
   a controller that controls operation of the exhaust gas turbocharger, wherein the exhaust gas turbocharger comprises:
      a turbocharger impeller that applies a pressure to the recirculation exhaust gas and supplies the resulting recirculation exhaust gas to the gas engine; and
      a turbocharger motor that rotates the turbocharger impeller, and wherein the controller performs control in such a manner that an rpm of the turbocharger motor is adjusted according to a concentration of harmful substances contained in the exhaust gas.

2. The gas heat-pump system of claim 1, wherein the gas heat-pump system further comprises:
   an exhaust gas sensor attached to the exhaust pipe, wherein the exhaust gas sensor is configured to sense the concentration of the harmful substances contained in the exhaust gas in the exhaust pipe, wherein the exhaust bypass pipe branches off from the exhaust pipe upstream from a position at which the exhaust gas sensor is attached, and wherein the controller receives a signal associated with the concentration of the harmful substances from the exhaust gas and measures the concentration of the harmful substances.

3. The gas heat-pump system of claim 2, wherein the harmful substances comprise at least one of carbon monoxide, nitrogen oxide, or hydrocarbon.

4. The gas heat-pump system of claim 2, wherein the controller compares the measured concentration with a first reference concentration and determines whether or not the measured concentration exceeds the first reference concentration, and wherein when the measured concentration is equal to or higher than the first reference concentration, the controller increases the rpm of the turbocharger motor, thereby increasing a turbocharge amount of the recirculation exhaust gas.

5. The gas heat-pump system of claim 4, further comprising:
   an intake manifold that supplies a fuel-to-air mixture to the gas engine;
   an intake manifold pressure sensor that senses a pressure of the fuel-to-air mixture within the intake manifold; and
   a recirculation exhaust gas pressure sensor that senses a turbocharger pressure of the recirculation exhaust gas discharged from the exhaust gas turbocharger, wherein the controller receives a signal associated with the pressure of the fuel-to-air mixture from the intake manifold pressure sensor and measures the pressure of the fuel-to-air mixture, and a signal associated with the turbocharger pressure of the recirculation exhaust gas from the recirculation exhaust gas pressure sensor and measures the turbocharger pressure of the recirculation exhaust gas supplied to the intake manifold.

6. The gas heat-pump system of claim 5, wherein the controller computes a pressure difference between the measured pressure of the fuel-to-air mixture and the measured turbocharger pressure of the recirculation exhaust gas, and computes a target turbocharger pressure of the recirculation exhaust gas.

7. The gas heat-pump system of claim 6, wherein the controller computes a current rpm of the turbocharger motor and increases the rpm of the turbocharger motor to a target rpm that is obtained by adding a predetermined increase to the computed current rpm.

8. The gas heat-pump system of claim 7, wherein the predetermined increase is 1,000 rpm.

9. The gas heat-pump system of claim 7, wherein the controller remeasures the turbocharger pressure of the recirculation exhaust gas through the recirculation exhaust gas and determines whether or not the remeasured turbocharger pressure of the recirculation exhaust gas reaches the target turbocharger pressure, and wherein when it is determined that the remeasured turbocharger pressure of the recirculation exhaust gas is equal to or higher than the target turbocharger pressure, the controller maintains the target rpm to which the rpm of the turbocharger motor is increased.

10. The gas heat-pump system of claim 9, wherein when it is determined that the remeasured turbocharger pressure of the recirculation exhaust gas is lower than the target turbocharger pressure, the controller increases the rpm of the turbocharger motor to an rpm that is obtained by adding the predetermined increase to the target rpm.

11. The gas heat-pump system of claim 2, wherein the controller compares the measured concentration of the harmful substances with a first reference concentration and determines whether or not the measured concentration of the harmful substances exceeds the first reference concentration, and wherein when it is determined that the measured concentration of the harmful substances is lower than the first reference concentration, the controller compares the measured concentration of the harmful substances with a second reference concentration that is lower than the first reference concentration.

12. The gas heat-pump system of claim 11, wherein when it is determined that the measured concentration of the harmful substances is equal to or higher than the second reference concentration, the controller maintains the rpm of the turbocharger motor, thereby maintaining the turbocharge amount of the recirculation exhaust gas.

13. The gas heat-pump system of claim 11, wherein when it is determined that the measured concentration of the harmful substances is lower than the second reference concentration, the controller decreases the rpm of the turbocharger motor, thereby decreasing the turbocharge amount of the recirculation exhaust gas.

14. The gas heat-pump system of claim 13, further comprising:
- an intake manifold that supplies a fuel-to-air mixture to the gas engine;
- an intake manifold pressure sensor that senses a pressure of the fuel-to-air mixture within the intake manifold; and
- a recirculation exhaust gas pressure sensor that senses a turbocharger pressure of the recirculation exhaust gas discharged from the exhaust gas turbocharger, wherein the controller receives a signal associated with the pressure of the fuel-to-air mixture from the intake manifold pressure sensor and measures the pressure of the fuel-to-air mixture, and a signal associated with the turbocharger pressure of the recirculation exhaust gas from the recirculation exhaust gas pressure sensor and measures the turbocharger pressure of the recirculation exhaust gas.

15. The gas heat-pump system of claim 14, wherein the controller computes a pressure difference between the measured pressure of the fuel-to-air mixture and the measured turbocharger pressure of the recirculation exhaust gas and computes a target turbocharger pressure of the recirculation exhaust gas.

16. The gas heat-pump system of claim 15, wherein the controller computes a current rpm of the turbocharger motor and decreases the rpm of the turbocharger motor to a target rpm that is obtained by abstracting a predetermined decrease from the computed current rpm.

17. The gas heat-pump system of claim 16, wherein the predetermined decrease is 1,000 rpm.

18. The gas heat-pump system of claim 16, wherein the controller remeasures the turbocharger pressure of the recirculation exhaust gas through the recirculation exhaust gas and determines whether or not the remeasured turbocharger pressure of the recirculation exhaust gas reaches the target turbocharger pressure, and wherein when it is determined that the remeasured turbocharger pressure of the recirculation exhaust gas is lower than the target turbocharger pressure, the controller maintains the target rpm to which the rpm of the turbocharger motor is decreased.

19. The gas heat-pump system of claim 18, wherein when it is determined that the remeasured turbocharger pressure of the recirculation exhaust gas is equal to or higher than the target turbocharger pressure, the controller decreases the rpm of the turbocharger motor to an rpm that is obtained by additionally abstracting the predetermined decrease from the target rpm.

\* \* \* \* \*